United States Patent [19]

Fujimoto et al.

[11] 4,054,344
[45] Oct. 18, 1977

[54] STORAGE RECEPTACLE FOR MAGNETIC TAPE CASSETTE

[75] Inventors: Kazumi Fujimoto; Kishio Ikeda, both of Tokyo, Japan

[73] Assignee: Sony Corporation, Tokyo, Japan

[21] Appl. No.: 673,590

[22] Filed: Apr. 5, 1976

[51] Int. Cl.² .............................................. A47B 81/06
[52] U.S. Cl. ...................................... 312/319; 312/15; 312/20; 220/306; 206/387
[58] Field of Search .................... 312/319, 12, 15, 20, 312/111; 220/339, 306; 206/387, 265; 292/87

[56] References Cited

U.S. PATENT DOCUMENTS

| 3,348,668 | 10/1967 | Amatsu et al. | 312/20 |
| 3,389,942 | 6/1968 | Jacob | 312/20 |
| 3,638,788 | 2/1972 | Solomon | 206/387 |
| 3,866,990 | 2/1975 | McRae | 312/15 |
| 3,899,229 | 8/1975 | Ackeret | 312/111 |
| 3,904,259 | 9/1975 | Hoffmann et al. | 312/111 |
| 3,909,088 | 9/1975 | Dennehey et al. | 312/20 |
| 3,968,880 | 7/1976 | Ostrowsky | 220/306 |
| 3,969,007 | 7/1976 | Lowry | 312/15 |

FOREIGN PATENT DOCUMENTS 224,840  4/1968  U.S.S.R. .............................. 206/387

Primary Examiner—Paul R. Gilliam
Assistant Examiner—Victor N. Sakran
Attorney, Agent, or Firm—Lewis H. Eslinger; Alvin Sinderbrand

[57] ABSTRACT

In a storage receptacle for a magnetic tape cassette which comprises a housing having spaced apart, parallel side walls which, between their forward edges, define an opening of the housing, and a holder pivotally connected with the housing for swinging movement through such opening between an opened position in which the holder projects forwardly from the housing for receiving and relinquishing a cassette, and a closed position in which the holder cooperates with the housing for enclosing a cassette cradled in the holder; the pivotal connection of the holder with the housing provides a fulcrum for the holder which is spaced rearwardly from the center of gravity of the holder with a cassette therein in all positions of the holder ranging from its closed position to its opened position so that the force of gravity urges the holder from its closed position to its opened position upon the release of a latch provided for releasably retaining the holder in its closed position.

4 Claims, 10 Drawing Figures

STORAGE RECEPTACLE FOR MAGNETIC TAPE CASSETTE

BACKGROUND OF THE INVENTION

1. Field of the Invention

This invention relates generally to storage receptacles for magnetic tape cassettes, and more particularly is directed to improvements in receptacles suitable for storing magnetic tape cassettes in a manner such that each cassette is enclosed in an individual compartment or space and protected from dirt, dust and the like.

2. Description of the Prior Art

Many types of storage receptacles for magnetic tape cassettes have been proposed. For example, in U.S. Pat. No. 3,904,259, a magnetic tape cassette storage container is disclosed to include a generally rectangular casing having an opening along one of its sides through which the cassette itself is slidably inserted in, and removed from the casing. A pivoted door is provided for closing the open side of the casing, and a generally U-shaped spring is mounted, at its center, against the inner surface of the side wall of the casing opposed to the open side thereof. During the insertion of a cassette into the casing, the cassette acts against the normally U-shaped spring so as to flex or relatively flatten the latter, with the result that the spring exerts a force on the cassette tending to eject the latter from the casing. Therefore, when inserting the cassette in the casing, the cassette has to be manually held within the casing until the door is closed and latched in its closed position. The foregoing operations inconveniently require the use of two hands for insertion of a cassette. Furthermore, when the latch is released to permit opening of the door, the spring force acting on the cassette may forcibly eject the cassette completely out of the casing past the open door. Thus, the foregoing magnetic tape cassette storage container has disadvantageous characteristics both when inserting and removing a cassette. Furthermore, since the cassette is slidably inserted in, and removed from the casing of the container while acted upon by the spring, the cassette housing will become scratched or marred in the course of repeated movements into and out of the casing.

In another storage container for a magnetic tape cassette, for example, as disclosed in U.S. Pat. No. 3,899,229, a rectangular casing which is open at the front side thereof is provided with a drawer which is guided for rectilinear movements between a closed position, in which the drawer is contained within the casing with the open side of the latter being closed by the drawer front, and an opened or extended position in which a cassette can be placed in, or removed from the extended drawer. A spring is interposed between the drawer and the casing so as to continuously urge the drawer to its opened or extended position, and a latch is provided for releasably holding the drawer in its closed position against the force of such spring. Although such storage container provided with a rectilinearly slidable drawer avoids some of the problems associated with the existing storage container first described above, in that the cassette is cradled in the drawer while being inserted in, and removed from the casing and thus protected from scratching or marring, the structures provided for guiding the drawer in its rectilinear sliding movements relative to the casing tend to jam. Further, when the drawer is in its opened position, the insertion or removal of a cassette inconveniently requires rather complicated and precise manipulations of the cassette.

In still another existing storage receptacle for a magnetic tape cassette, for example, as disclosed in U.S. Pat. No. 3,909,088, the receptacle includes a housing constituted by spaced apart, L-shaped side walls having their vertical and horizontal portions connected by a back wall and a bottom wall, respectively, and a substantially rectangular container which is pivotally connected to the housing for swinging relative to the latter about an axis extending through a corner of the rectangular casing and through ends of the horizontal portions of the L-shaped side walls of the housing. In an opened position of the container in which the latter extends forwardly from the pivoting axis, the upwardly facing side of the rectangular casing is open for the insertion and removal of a cassette therethrough. When the container is pivotally moved to its closed position, the sides thereof interfit with the adjacent L-shaped side walls of the housing and the container and housing cooperate to enclose the cassette therein. Although the pivotal connection of the container with the housing is advantageous in that it is simple and not subject to binding or jamming, the location of the pivoting axis of the container is such that, with the container in its closed position and having a cassette therein, the force of gravity acts in back of the pivoting axis to urge the container to such closed position. Thus, when it is desired to remove a cassette from the storage receptacle of the foregoing type, the pivoted container has to be manually displaced from its closed position in respect to the associated housing.

OBJECTS AND SUMMARY OF THE INVENTION

Accordingly, it is an object of this invention to provide an improved storage receptacle for a magnetic tape cassette which avoids the above mentioned disadvantages of the storage receptacles or containers previously proposed for that purpose.

More specifically, an object of this invention is to provide a storage receptacle for a magnetic tape cassette which facilitates the insertion and removal of the cassette without the likelihood of scratching or marring the cassette housing during such insertion and removal, and which protects the cassette from dirt, dust and the like, when the cassette is contained in the storage receptacle.

Another object is to provide an improved storage receptacle for a magnetic tape cassette, as aforesaid, in which the simple actuation of a latch causes the automatic opening of the receptacle, with the cassette being then safely held or cradled in a holder which is positioned for the convenient insertion or removal of the cassette.

Still another object is to provide a magnetic tape cassette storage receptacle, as aforesaid, which includes a housing having an opening at the front thereof, and a holder for a magnetic tape cassette movable through such front opening of the housing between an opened position in which the holder projects forwardly from the housing for receiving and relinquishing a cassette, and a closed position in which the holder cooperates with the housing for enclosing a cassette in the holder, and in which the holder is pivotally connected to the housing so as to be urged to its opened position by the force of gravity upon the release of a latch provided for retaining the holder in its closed position.

In accordance with an aspect of this invention, in a storage receptacle for a magnetic tape cassette comprising a housing having spaced apart, parallel side walls which, between their forward edges, define an opening of the housing, and a holder pivotally connected with the housing for swinging movement through such opening between an opened position in which the holder projects forwardly from the housing for receiving and relinquishing a cassette, and a closed position in which the holder cooperates with the housing for enclosing a cassette in the receptacle, the pivotal connection of the holder with the housing provides a fulcrum for the holder which is spaced rearwardly from the center of gravity of the holder with a cassette therein in all positions of the holder ranging from its closed position to its opened position so that the force of gravity urges the holder from its closed position to its opened position upon the release of a latch provided for releasably retaining the holder in its closed position.

The above, and other objects, features and advantages of the invention, will be apparent in the following detailed description of illustrative embodiments thereof which is to be read in connection with the accompanying drawings.

DESCRIPTION OF A PREFERRED EMBODIMENT

Figure 1:
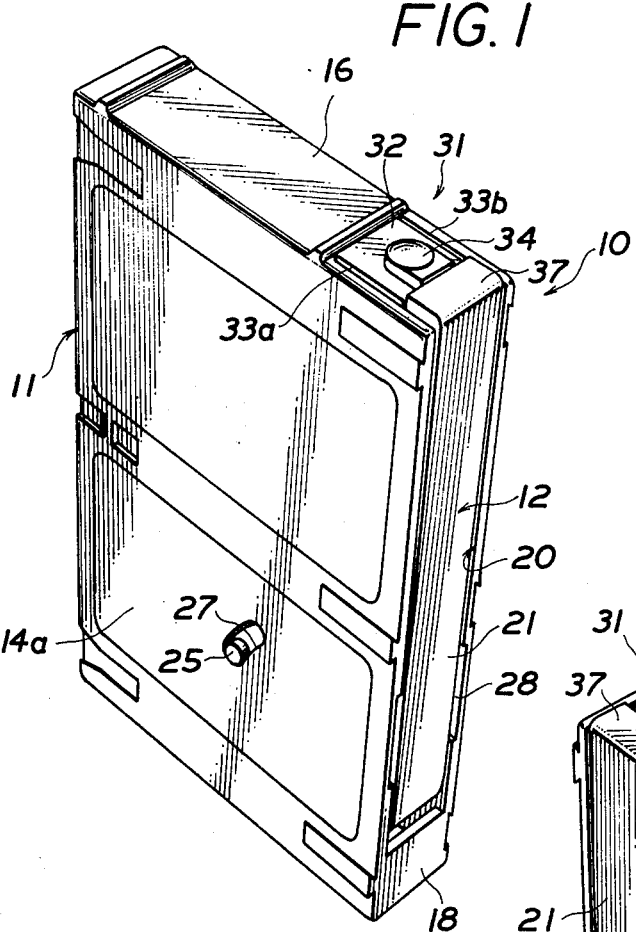
FIG. 1 is a perspective view of a magnetic tape cassette storage receptacle according to an embodiment of this invention, and which is show in its closed condition.
Figure 2:
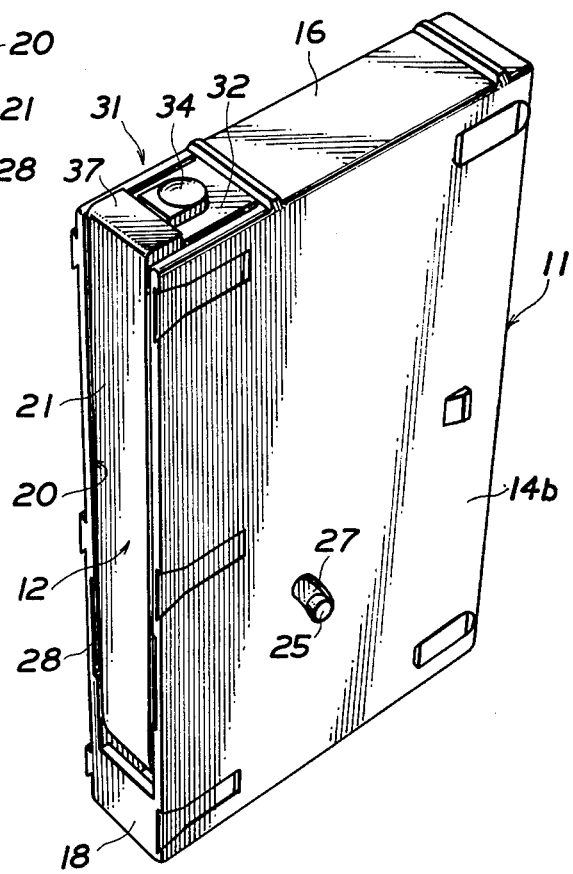
FIG. 2 is a perspective view similar to that of FIG. 1, but showing the opposite side of the storage receptacle.
Figure 3:
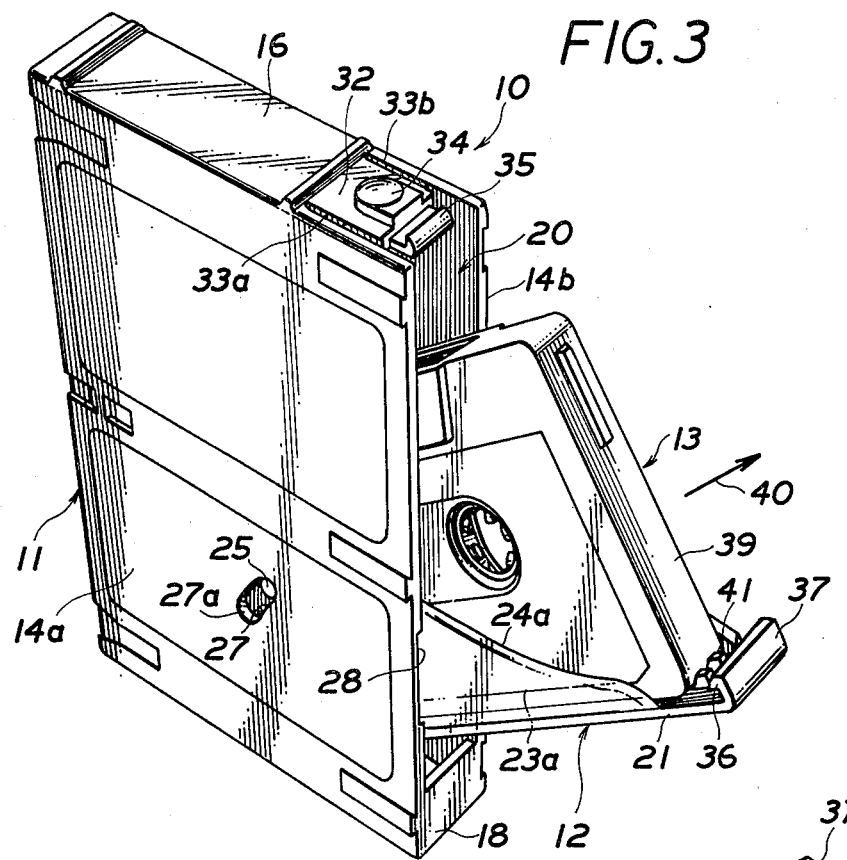
FIG. 3 is a perspective view similar to that of FIG. 1, but showing the storage receptacle in its open condition with a magnetic tape cassette cradled in the holder of the storage receptacle.

Referring to the drawings in detail, and initially to FIGS. 1-3 thereof, it will be seen that a magnetic tape cassette storage receptacle 10 according to this invention generally comprises a housing 11 and a holder 12 which is pivotally connected with housing 11 for swinging movement relative to the latter between an opened position (FIG. 3) in which holder 12 projects forwardly from housing 11 for receiving and relinquishing a cassette 13, and a closed position (FIGS. 1 and 2) in which holder 12 cooperates with housing 11 for enclosing a cassette cradles in the holder.

Figure 6:
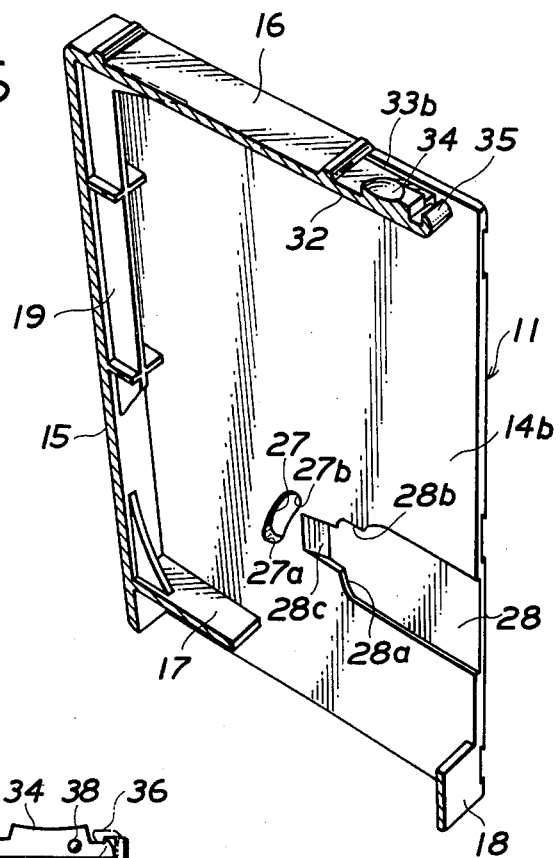
FIG. 6 is a perspective view, partly broken away and in section, of the housing which forms a part of the storage receptacle of FIGS. 1-3.
Figure 7:
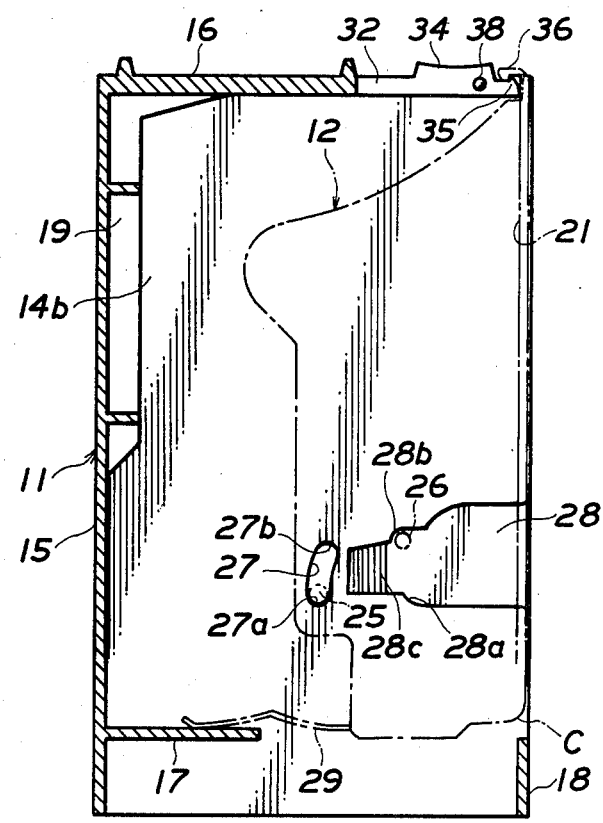
FIG. 7 is a vertical sectional view of the housing, with the holder being shown in broken lines in its closed position.

The housing 11 which is preferably molded of a suitable plastic resin is shown to include spaced apart, parallel side walls 14a and 14b which are substantially rectangular (FIGS. 1-3 and 6-9), and which are joined together by a back wall 15, a top wall 16, a shelf or abutment 17 directed forwardly from the lower end portion of back wall 15, and a cross piece 18 extending between the lower end portions of side walls 14a and 14b at the front of housing 11. Further, as shown, a stiffening web arrangement 19 may extend along the upper portion of back wall 15 from the back end portion of top wall 16 (FIGS. 6 and 7). In the foregoing housing 11, a vertically elongated opening 20 is defined at the front of the housing between the forward edges of side walls 14a and 14b above cross piece 18.

Figure 4:
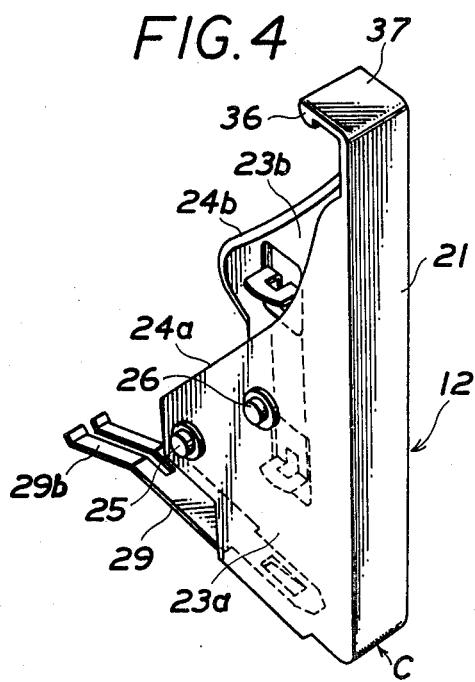
FIG. 4 is a perspective view of the holder which forms a part of the storage receptacle shown on FIGS. 1-3.
Figure 5:
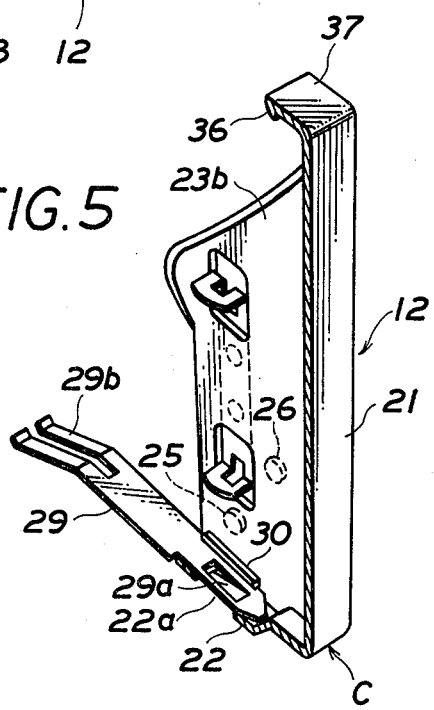
FIG. 5 is a perspective view similar to that of FIG. 4, but showing the holder partly broken away and in section.

As shown particularly on FIGS. 4 and 5, the holder 12, which is also preferably molded of a plastic resin, includes a front wall 21 dimensioned to close opening 20 in the closed position of holder 12, a bottom wall 22 directed substantially at right angles to front wall 21 for defining a corner C at the bottom of the latter, and spaced apart side walls 23a and 23b directed upwardly from bottom wall 22 along the opposite sides of front wall 21. The side walls 23a and 23b of holder 12 are suitably spaced apart to accommodate a magnetic tape cassette 13 therebetween, and preferably have upper edges 24a and 24b, respectively, that are inclined downwardly from front wall 21 and bevelled inwardly.

In order to pivotally connect holder 12 with housing 11, first laterally aligned pivot members 25 project outwardly from side walls 23a and 23b of holder 12 at substantial distances from front wall 21, and second laterally aligned pivot members 26 also project outwardly from side walls 23a and 23b and are located closer to front wall 21 than pivot members 25 at a greater distance upwardly from bottom wall 22.

Figure 8:
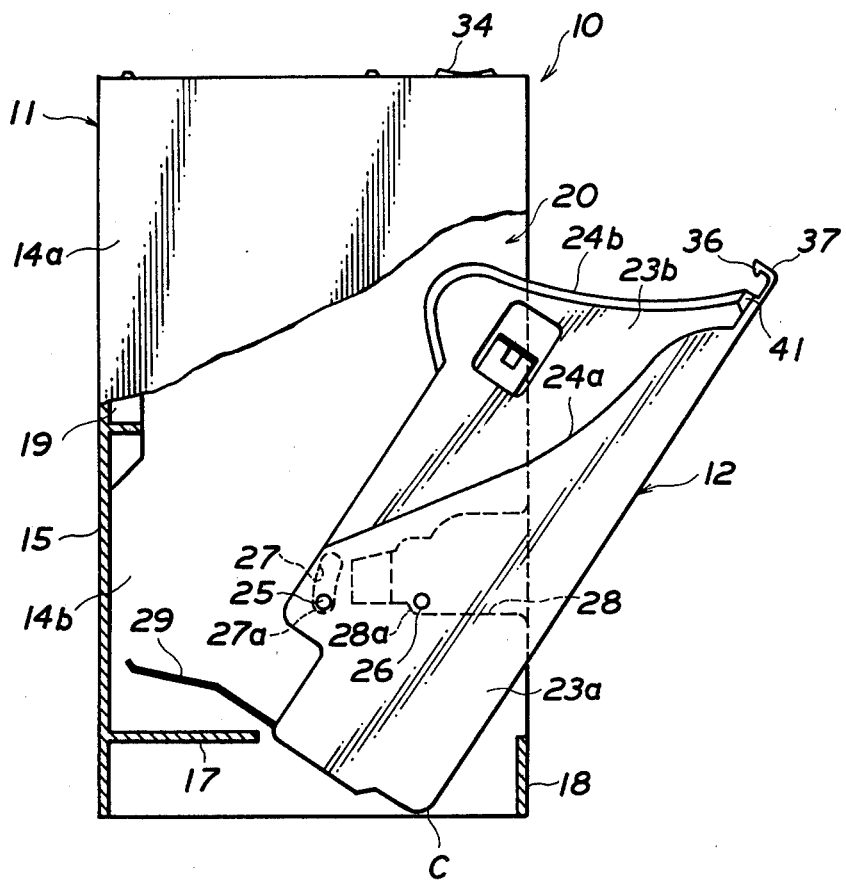
FIGS. 8 and 9 are side elevational views of the storage receptacle according to this invention with the housing thereof being shown partly broken away and in section, and with the holder being respectively shown at an intermediate position between its closed and opened positions, and at its opened position.
Figure 9:
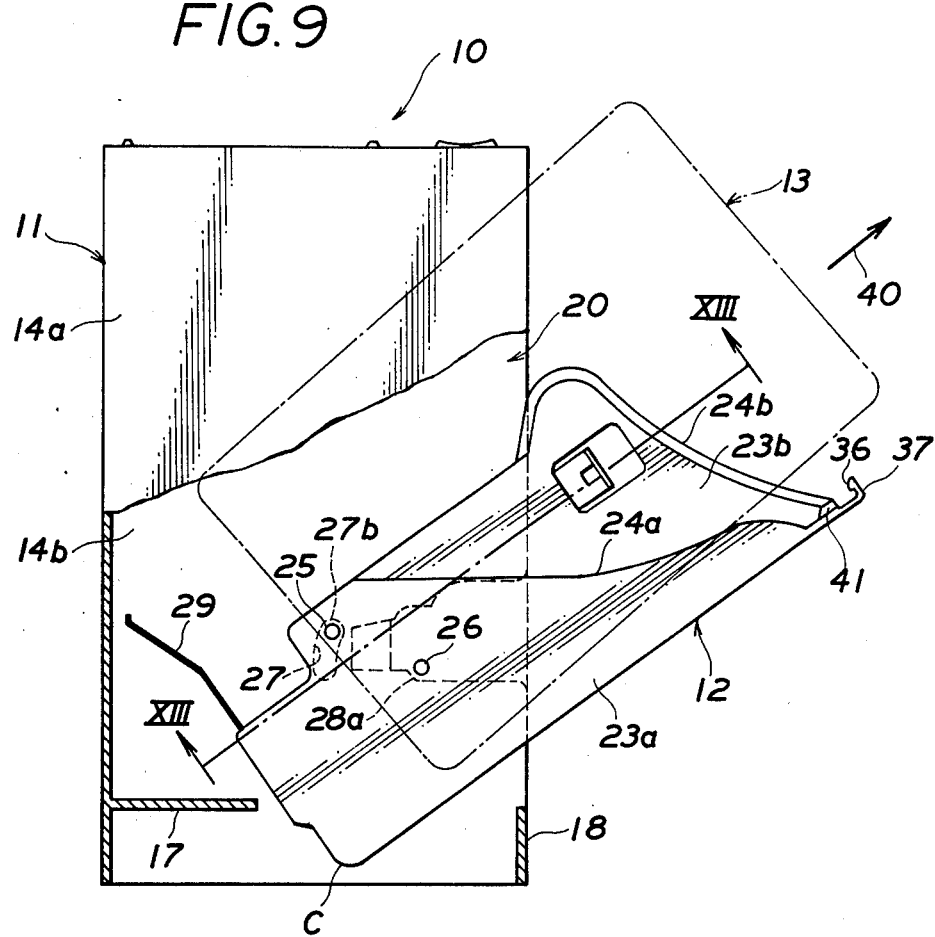

The side walls 23a and 23b of holder 21 are movable between side walls 14a and 14b of housing 11, and such side walls 14a and 14b are formed with arcuate slots 27 therein which extend generally vertically, and which are adapted to slidably receive the first pivot members 25 extending from the adjacent side walls 23a and 23b of holder 12. The slots 27 are located so that, with pivot members 25 of holder 12 engaging first seats defined at the lower ends 27a of slots 27 and with front wall 21 of the holder extending vertically, such front wall 21 will be disposed between the forward edges of side walls 14a and 14b above cross piece 18 and will close front opening 20 of housing 11 (FIGS. 1 and 2). Further, as shown particularly on FIGS. 6 and 7, the inner surfaces of side walls 14a and 14b of the housing have recesses 28 extending forwardly in respect to the slots 27 and opening at the forward edges of side walls 14a and 14b for loosely accommodating the second pivot members 26 which project from the adjacent side walls 23a and 23b of holder 12 (FIGS. 7-9). The lower margin of each recess 28 has an upwardly curved portion 28a (FIG. 7) defining a second seat for the respective second pivot member 26 and which is at approximately the same level as the first seat 27a defined at the bottom of the respective slot 27. Further, the upper margin of each recess 28 has a downwardly curved portion 28b which forms a stop for limiting the upward movement of the respective second pivot member 26. Finally, each recess 28, at its end adjacent the respective slot 27 has an inclined ramp 28c leading from the recess to the inner surface of the respective side wall 14a or 14b.

When assembling together the described housing 11 and holder 12 of storage receptacle 10, the holder 12 is initially tilted relative to housing 11, for example, as shown on FIG. 8, and the lower end portion of holder 12 is inserted into opening 20 above cross piece 18 with the first and second pivot members 25 and 26 at the opposite sides of holder 12 successively entering the respective recesses 28 at the forward edges of side walls 14a and 14b. As the inclined or tilted holder 12 is further displaced rearwardly in respect to housing 11, first pivot members 25 ride on inclined ramps 28c so as to leave recesses 28 with consequent inward flexing of the respective side walls 23a and 23b until pivot members 25 come into registry with, and snap outwardly into the respective slots 27.

As shown particularly on FIG. 5, a leaf spring 29 extends rearwardly from bottom wall 22 of holder 12 so as to be movable with the latter. In order to secure leaf spring 29 to holder 12, the forward end portion of leaf spring 29 may have a downwardly and rearwardly inclined tab 29a struck therefrom while a downwardly offset rear portion of bottom wall 22 is formed with an opening 22a to receive the tab 29a. Further, side walls 23a and 23b of holder 12 are shown to be formed with inwardly directed bars 30 spaced upwardly from the rear portion of bottom wall 22 by a small distance approximately equal to the thickness of leaf spring 29. Thus, in assembling together spring 29 with holder 12, the forward end portion of the leaf spring is moved slidably over the rear portion of bottom wall 22 under bars 30 until tab 29a snaps into opening 22a for securing spring 29 to the holder. Spring 29 is formed with a bifurcated rear end portion 29b (FIGS. 4 and 5) which, in the closed position of holder 12, as indicated in broken lines on FIG. 7, bears downwardly on the shelf or abutment 17 provided within the lower portion of housing 11.

In order to releasably retain holder 12 in its closed position (FIGS. 1, 2 and 7) storage receptable 10 further includes a latch mechanism 31. Such latch mechanism 31 is shown to include a resilient tongue 32 formed as a forwardly directed extension of top wall 16 of housing 11. Tongue 32 is separated from the adjacent top edge portions of side walls 14a and 14b by slots 33a and 33b so as to permit tongue 32 to be depressed downwardly between the top edge portions of walls 14a and 14b, for example, by the manual application of pressure on tongue 32 at a pad 34 provided thereon. A latch element 35 (FIGS. 3, 6 and 7) is provided at the free end of resilient tongue 32 in the form of an upwardly directed raked tooth 35 having an upwardly and rearwardly sloping front surface. The latch 31 is completed by a latch element 36 (FIGS. 3–5) in the form of a raked tooth depending from the back edge of a flange 37 directed rearwardly from the upper end of front wall 21 of holder 12. When holder 12 is moved to its closed position (FIGS. 1, 2 and 7) latch tooth 36 at the top of the holder snaps over and engages latch tooth 35 on tongue 32 so as to retain holder 12 in its closed position. On the other hand, when tongue 32 is depressed by the application of downwardly directed pressure to pad 34, latch tooth 35 is moved downwardly and thus disengaged from latch tooth 36 so as to free holder 12 for movement from its closed position to its opened position.

Figure 10:
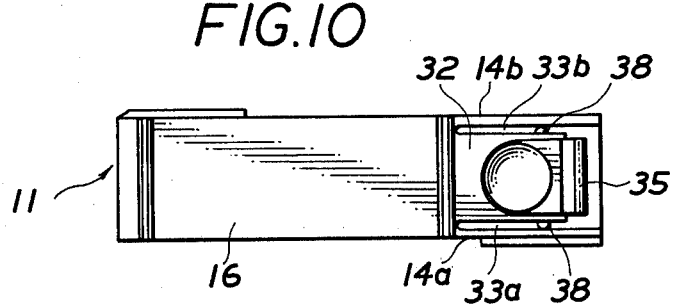
FIG. 10 is a top plan view of the housing included in the storage receptacle of FIGS. 1-9, and particularly showing details of a latch element forming an integral part of such housing.

Since housing 11 is preferably molded of a plastic resin, side walls 14a and 14b are somewhat resiliently flexible, particularly at their forward upper portions where slots 33a and 33b separate the side walls from tongue 32. Thus, if side walls 14a and 14b are grasped and pressed toward each other at the forward upper portions thereof when a force is being applied downwardly to pad 34 for releasing latch 31, there is a possibility that side walls 14a and 14b will be flexed toward each other to seize the upper part of holder 12 and thereby impede the movement of holder 12 toward its open position even though latch 31 is released. In order to avoid the foregoing, projections 38 (FIGS. 7 and 10) extend from the opposite longitudinal edges of tongue 32 across slots 33a and 33b into engagement with the adjacent side walls 14a and 14b of housing 11. Thus, even if the forward upper portions of side walls 14a and 14b are pressed toward each other, projections 38 prevent the narrowing of the space between the side walls and thereby ensure that holder 12 will be free to move towards its open position upon the release of latch 31.

As is shown on FIG. 3, the conventional magnetic tape cassette 13 having a generally rectangular cassette housing 39 is disposed or cradled between side walls 23a and 23b of holder 12 with one of the relatively long sides of cassette housing 39 extending along front wall 21, and with a relatively short side of the cassette housing resting against bottom wall 22 of the cassette housing. When holder 12 is in its opened position (FIGS. 3 and 9) cassette 13 may be conveniently withdrawn therefrom in the forward and upward direction, as indicated by the arrow 40. In order to ensure that flange 37 and latch tooth 36 thereon will not interfere with such withdrawal of the cassette 13 from holder 12, inclined projections 41 (FIGS. 3, 8 and 9) are formed on front wall 21 a short distance below flange 37 and act to upwardly deflect the adjacent corner of cassette housing 39 as the cassette is being withdrawn from holder 12.

In the closed position of holder 12 (FIG. 7) a cassette cradled in the holder is held against substantial movement in the forward and rearward directions between web structure 19 at the back of housing 11 and front wall 21 of the holder and, in the vertical direction, between bottom wall 22 of the holder and the projections 41 adjacent the upper end of front wall 21. Further, in the closed position of holder 12, pivot members 25 engage the respective seats 27a at the lower ends of slots 27 for initially defining the fulcrum of pivotal movement of holder 12, while pivot members 26 engage the respective stops 28b defined by the upper margins of recesses 28 to prevent lifting of holder 12, and hence disengagement of latch tooth 36 from latch tooth 35, under the influence of the upwardly directed force of spring 29 bearing on abutment 17.

In accordance with the present invention, pivot members 25 are disposed so that the fulcrum for holder 12 defined by the engagement of such pivot members 25 with seats 27a in the closed position of holder 12 will be spaced rearwardly in respect to the center of gravity of holder 12 with a cassette in the latter. Thus, when latch 31 is released by depressing tongue 32, the force of spring 29 in combination with the force of gravity will cause forward pivotal movement of holder 12 away from its closed position about the fulcrum defined by the engagement of pivot members 25 with seats 27a. Following the initial pivotal movement of holder 12 from its closed position, leaf spring 29 will lift off seat or abutment 17 and thus no longer influence the movement of holder 12.

In the course of the forward pivotal movement of holder 12 away from its closed position about the fulcrum defined by the engagment of pivot members 25 with seats 27a, pivot members 26 move downwardly in an arcuate path within recesses 28 and, when holder 12 attains the intermediate position shown on FIG. 8, will engage the seats 28a defined at the lower margins of recesses 28. It will be apparent that, during the pivotal movement of holder 12 from its closed position to the intermediate position of FIG. 8, the corner C at the lower end of holder 12 has been moving downwardly and attains approximately the level of the lower edges of side walls 14a and 14b of the housing when holder 12 reaches the intermediate position of FIG. 8. Upon the engagement of pivot members 26 with seats 28a which are disposed substantially vertically above corner C with holder 12 in the intermediate position of FIG. 8, further forward pivotal movement of the holder about the fulcrum defined by the engagement of pivot members 25 with seats 27a is prevented. However, in accordance with this invention, pivot members 26 are located so that, when holder 12 attains the intermediate position of FIG. 8, the engagement of pivot members 26 with seats 28a defines a fulcrum for holder 12 which is disposed rearwardly in respect to the center of gravity of holder 12 with a cassette therein. Therefore, forward pivotal movement of holder 12 continues beyond the intermediate position of FIG. 8 about the fulcrum defined by the engagement of pivot members 26 with seats 28a. During such further forward pivotal movement of holder 12, pivot members 25 move upwardly in arcuate slots 27 until pivot members 25 engage the upper ends 27b of the respective slots and thereby limit the forward pivotal movement of holder 12 at the opened position thereof (FIG. 9).

It will be apparent from the above that, in all positions of holder 12 ranging from its closed position to its opened position, the fulcrum for pivotal movement of holder 12 is spaced rearwardly from the center of gravity of the holder with a cassette therein. Thus, upon the release of latch 31, holder 12 is automatically moved by the force of gravity from its closed position to its opened position.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of this invention as defined in the appended claims.

What is claimed is:

1. A storage receptacle for a magnetic tape cassette comprising:
    a housing including spaced apart, parallel side walls which, between their forward edges, define an opening of said housing;
    a holder for embracing a magnetic tape cassette and which is movable with the cassette carried by said holder through said opening of the housing between said side walls of the latter; and
    pivot means connecting said holder with said housing for swinging relative to the latter between an opened position in which said holder projects forwardly from said housing for receiving and relinquishing a cassette, and a closed position in which said holder cooperates with said housing for enclosing a cassette in said holder;
    said pivot means being spaced rearwardly from the center of gravity of said holder, calculated with a cassette therein, in all positions of said holder ranging from said closed position to said opened position so that the force of gravity urges said holder with a cassette therein from said closed position to said opened position.

2. A storage receptacle according to claim 1; further comprising latch means for releasably securing said holder in said closed position thereof.

3. A storage receptacle according to claim 2; in which said latch means includes a resilient tongue which is depressible between said side walls of the housing at the top of the latter, and oppositely raked latch teeth on said tongue and at the top of said holder in said closed position, said latch teeth engaging each other in said closed position and being released from each other when said resilient tongue is depressed.

4. A storage receptacle according to claim 2; in which said holder has spaced apart side walls movable between said side walls of the housing, and said pivot means are provided at the adjacent side walls of said housing and holder, respectively.

* * * * *